United States Patent
Ohshima

(10) Patent No.: US 7,015,665 B2
(45) Date of Patent: Mar. 21, 2006

(54) POWER WINDOW DRIVING APPARATUS

(75) Inventor: Shunzou Ohshima, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/935,071

(22) Filed: Sep. 8, 2004

(65) Prior Publication Data
US 2005/0088130 A1 Apr. 28, 2005

(30) Foreign Application Priority Data
Sep. 8, 2003 (JP) ............................. 2003-315702

(51) Int. Cl.
H02P 1/00 (2006.01)

(52) U.S. Cl. ...................... 318/280; 318/283; 318/445; 318/466; 361/23; 361/24

(58) Field of Classification Search ........ 318/280–283, 318/286, 432–434, 443, 445, 466–468; 361/23, 361/24, 31, 33
See application file for complete search history.

(56) References Cited

U.S. PATENT DOCUMENTS

| 4,562,387 | A | * | 12/1985 | Lehnhoff | ..................... 318/285 |
| 5,917,299 | A | * | 6/1999 | Kumagai et al. | ........... 318/466 |
| 6,335,577 | B1 | * | 1/2002 | Baba | ........................... 307/28 |
| 6,744,609 | B1 | * | 6/2004 | Hiwatari et al. | ............... 361/24 |
| 6,876,531 | B1 | * | 4/2005 | Nakazawa et al. | ............ 361/92 |

FOREIGN PATENT DOCUMENTS

| JP | 10-25964 A | 1/1998 |
| JP | 2002-089132 A | 3/2002 |
| JP | 2002-96632 A | 4/2002 |
| JP | 2002-295129 A | 10/2002 |

* cited by examiner

Primary Examiner—Rina Duda
(74) Attorney, Agent, or Firm—Sughrue Mion, PLLC

(57) ABSTRACT

A power window driving apparatus includes a motor which drives a window by supplying a supply voltage of a power supply, a control circuit which controls the motor so as to stop or reverse a rotation of the motor when a motor current flowing to the motor is increased, a shunt resistance which detects the motor current as a voltage value, and is provided between the motor and a ground and a diode which is provided between a positive side of the power supply and the control circuit for protecting the control circuit.

13 Claims, 3 Drawing Sheets

POWER WINDOW DRIVING APPARATUS

BACKGROUND OF THE INVENTION

The present invention relates to a power window driving apparatus adapted to stop or reverse quickly the driving of a power window equipped on a vehicle in the event that the a jamming of an obstacle by the power window occurs while the power window is being driven, and more particularly to a technique for ensuring the protection of a circuit even in the event that positive and negative terminals of a battery are connected inversely.

In power windows equipped on a vehicle, window glasses are raised or lowered by applying a battery voltage to driving motors reversibly so as to switch the rotation of the driving motors between normal and reverse directions.

In addition, during the operation of the power window, there may occur a case where an obstacle is seized by the window glass, resulting in a trouble where, in case the obstacle is part of the occupant, the occupant gets injured unexpectedly or in case the obstacle is an implement, the implement gets damaged.

In order to solve the problem like this, as described in, for example, JP-A-2002-295129 (FIG. 3), there is proposed a technique for avoiding a trouble associated with the jamming of an obstacle by the window glass by stopping or reversing the window glass when detecting the jamming of an obstacle by the window glass in the event that the jamming of an obstacle by the window glass actually happens.

FIG. 3 is a circuit diagram showing the configuration of a power window driving apparatus described in the JP-A-2002-295129 As shown in the diagram, this driving apparatus includes a driving motor M101 for raising or lowering a window glass and a relay RY101 for enabling the application of a battery voltage VB to the driving motor M101 in such a manner that the polarity of the battery voltage VB can be switched so as to drive to rotate the driving motor reversibly. The relay RY101 includes FETs (T102), (T103) for normal rotating operation and reverse rotating operation, respectively.

Furthermore, the driving apparatus includes a shunt resistance R101 interposed between the power supply V1B and the driving motor M101 for detecting an excess current when the excess current is actually generated and an FET (T101) interposed between the driving motor M101 and a ground for stopping the supply of voltage to the driving motor M101 so as to stop raising or lowering a window glass when an excess current is actually generated.

In addition, the driving apparatus includes a current detection circuit which includes the shunt resistance R101 and a current limiting circuit which includes the FET (T101), and as shown in the diagram, the current detection circuit has comparators CMP11, CMP12, FETs (T121), (T122), resistances R120 to R125, R128, capacitors C11, C12 and a diode D121.

Additionally, the current limiting circuit includes a comparator CMP13, FETs (T131), (T132), resistances R131 to R137, a diode D131 and a NOR circuit NOR11.

Furthermore, the driving apparatus includes an OR circuit OR11, AND circuits AND1, AND2, a flip-flop circuit and a counter circuit.

Then, in the event that there occurs a jamming by the window glass while the driving motor M101 is being driven to rotate to thereby increase a current ID which flows to the driving motor M101, since a current Iref-f flowing to the FET (T122) is increased and a current Iref-s is slow to follow the increase in the current ID, an output signal of the comparator CMP12 becomes an L level, whereby an output signal of the NOR circuit NOR11 becomes an H level, and the FET (T131) is switched on, whereas the FET (T101) is switched off. As a result, the driving of the driving motor M101 is stopped.

Thereafter, the voltage of a positive side input terminal of the comparator CMP13 is increased by switching off the FET (T101), and an output signal of the comparator CMP13 changes to an H level, whereby an output signal of the NOR circuit NOR11 becomes an L level, and the FET (T131) is switched off, whereas the FET (T101) is switched on. Namely, the voltage supply to the driving motor M101 is started.

In the event that an excess current is generated in the current ID which still flows to the driving motor in this state, the above operation is repeated. Namely, the switching on and off of the FET (T101) is repeated. Then, the number of times of such repetition is counted by a counter, and in the event that the operation is repeated a predetermined number of times or more, it is determined that the jamming of an obstacle by the window glass is occurring, output signals to the AND circuits AND1, AND2 are stopped so as to stop the relay RY101, whereby the driving of the driving motor M101 is stopped.

According to the configuration, when the jamming of an obstacle by the window glass occurs to thereby increase a load current, the driving of the window glass can be stopped certainly.

In the technique described in JP-A-2002-295129, however, no countermeasures against an erroneous opposite connection to the battery to be taken. Namely, there may occur a case where the user or mechanic makes an erroneous opposite connection to the terminals (positive and negative) of the battery, and in order to deal with the case like this, a protection circuit needs to be equipped on electronic/measuring instruments and power equipment to protect them against damage even in the event that an erroneous opposite connection is made to the battery.

In the circuit shown in FIG. 3, a method is conceived in which a diode is provided between the FET (T131) and the ground (a position indicated by reference character B) or between the battery power supply terminal (positive) and the control circuit power supply (a position indicated by reference character A).

Here, in the event that a diode is placed at the position indicated by the reference character B, the drain voltage of the FET (T131) is increased by an extent to which the voltage is dropped by the diode (for example, 0.7 volt), causing a case where the FET (T101) cannot be switched off. In order to deal with this, while a method is conceived in which a diode is interposed between the FET (T101) and the ground, the placement of a diode for large current eventually calls for the enlargement in size of the apparatus and increase in costs and therefore it is not practical.

In addition, in the event that a diode is placed at the position indicated by the reference character A, a voltage coinciding with a voltage generated in the shunt resistance R101 cannot be generated in the resistance R120 due to a voltage drop by the diode so placed, causing a problem that a highly accurate control cannot be attained.

SUMMARY OF THE INVENTION

The invention was made with a view to solving the problems, and an object thereof is to provide a power window driving apparatus which can detect with high accuracy the jamming of an obstacle by a window glass even in the event that an element for preventing an erroneous opposite connection to a battery is inserted so as to control the rising and lowering of the window glass.

In order to achieve the above object, according to the present invention, there is provided a power window driving apparatus, comprising:

a motor, which drives a window by supplying a supply voltage of a power supply;

a control circuit, which controls the motor so as to stop or reverse a rotation of the motor when a motor current flowing to the motor is increased;

a shunt resistance, which is provided between the motor and a ground, and detects the motor current as a voltage value; and a diode, which is provided between a positive side of the power supply and the control circuit for protecting the control circuit when the power supply is inversely connected.

According to the present invention, there is also provided a power window driving apparatus, comprising:

a motor, which drives a window by supplying a supply voltage of a power supply;

a shunt resistance, which detects a motor current flowing to the motor, and is provided between the motor and a ground;

a control circuit, which controls the motor, and the control circuit comprising:

a reference current generator, which includes:
  a first circuit, which has a reference resistance (20) and generates a reference current (Ir) which has a level corresponding to the motor current by detecting a voltage generated in the shunt resistance, and the first circuit causing a current to flow to the reference resistance so that a voltage generated in the reference resistance becomes substantially equal to a voltage generated in the shunt resistance, and the first current (Ir1) having a level corresponding to a variation value of the motor current; and
  a second circuit, which generates a second current (Ir3) which constitutes a difference between the reference current and the first current;

a comparator, which compares a reference voltage (Vc) generated from a time mean value of a first voltage (Vc2) with a comparison signal (Vins) being greater than the first voltage, and determines whether or not an excess current flows to the motor based on a result of a comparison thereof, the first voltage and the comparison signal being converted from the first current; and a controller, which stops or reverses a rotation of the motor when the comparator determines that the excess current flows to the motor, wherein the shunt resistance is provided between the motor and a ground; and wherein a diode is provided between a positive side of the power supply and the control circuit for protecting the control circuit when the power supply is inversely connected.

Preferably, the reference resistance is connected to the first circuit and the second circuit which are connected in parallel. The reference current which is formed by merger of the first current with the second current flows to the reference resistance. The reference current generator controls a magnitude of the first current so as to equalize a voltage generated in the shunt resistance with a voltage generated in the reference resistance.

Preferably, the first circuit includes a first amplifier (AMP1) for detecting a difference between a voltage generated in the shunt resistance and a voltage generated in the reference resistance, a first semi-conductor element (T22) which is controlled based on an output signal of the first comparator, and a first resistance (R24+R27) connected between an end of the first semi-conductor element and the power supply, the other end of the first semi-conductor element being connected to the reference resistance. A voltage drop by the first resistance is proportional to the first current when the first semiconductor element is operated.

Preferably, the reference voltage (VC) is generated as the time mean value of the first voltage, when a voltage (Vc2) at a connecting point between the first resistance and the first semi-conductor element is the first voltage. The second current is proportional to a difference between the supply voltage (VB1) and the reference voltage (Vc). The second current is equal to the reference current by adding the first current.

Preferably, the power window driving apparatus comprises a reference voltage generator, which has a capacitor (C1) connected between the supply voltage and the reference voltage (Vc); the reference voltage generator generating the reference voltage (Vc) from the first voltage (Vc2). The capacitor (CG) is discharged by a constant-current so as to increase the reference voltage (Vc), when the first voltage (Vc2) is greater than the reference voltage (Vc). The capacitor (C1) is charged by a constant-current so as to fall the reference voltage (Vc) into the time mean value of the first voltage (Vc2), when the first voltage (Vc2) is smaller than the reference voltage (Vc).

Preferably, the second current generating circuit includes; a serial connection circuit, having a second semiconductor element (T21) and a second resistance (R23) which are connected in series, the second resistance being connected to the power supply, and the second semi-conductor element being connected to the reference resistance; and a second comparator (AMP2), which compares a voltage (Vc3) at a connecting point between the second semi-conductor element and the second resistance with the reference voltage, wherein the second semi-conductor element is controlled based on an output signal of the second comparator so that the voltage (Vc3) at the connecting point coincides with the reference voltage (Vc).

Preferably, the first resistance is constituted by a third resistance (R24) and a fourth resistance (R27), a voltage at a connecting point between the third resistance and the fourth resistance being a comparison signal (Vins). The comparator includes a third comparator (CMP1) which compares the comparison signal with the reference voltage. When the third comparator determines that the comparison signal is larger than the reference voltage, a third semiconductor element (T1) for supplying the motor current is turned on. When the third comparator determines that the comparison signal is smaller than the reference voltage, the third semi-conductor element is turned On and Off, so that the motor current is limited so as to fall within a constant range.

Preferably, the power window driving apparatus comprises a current limit width setting circuit, which derives a third current from the connecting point between the third resistance and the fourth resistance. A current range within which the motor current is limited is proportional to the third current.

Preferably, the magnitude of the third current is set so as to depend on the magnitude of the supply voltage, so that the third current increases as the supply voltage increases.

Preferably, a threshold voltage for determining that an excess current is flown to the motor is proportional to the motor current. The magnitude of the threshold voltage is set based on a resistance ratio of the second resistance (R23), the third resistance (R24) and the fourth resistance (R27).

Preferably, when the motor current pulsates due to a rectifying action of the motor so that the first current pulsates, the magnitude of the third current is set so as to limit a pulsating amplitude of the first current.

With the power window driving apparatus according to the invention, since the shunt resistance is provided between the motor and the ground in order to generate the voltage signal which is proportional to the current value which flows to the motor and the diode for preventing the opposite connection to the power supply is provided between the positive side of the supply voltage and the control circuit, the seizure of an obstacle by the window glass can be detected with high accuracy, and even in the event that an erroneous opposite connection is made to the power supply, the circuit can be protected.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
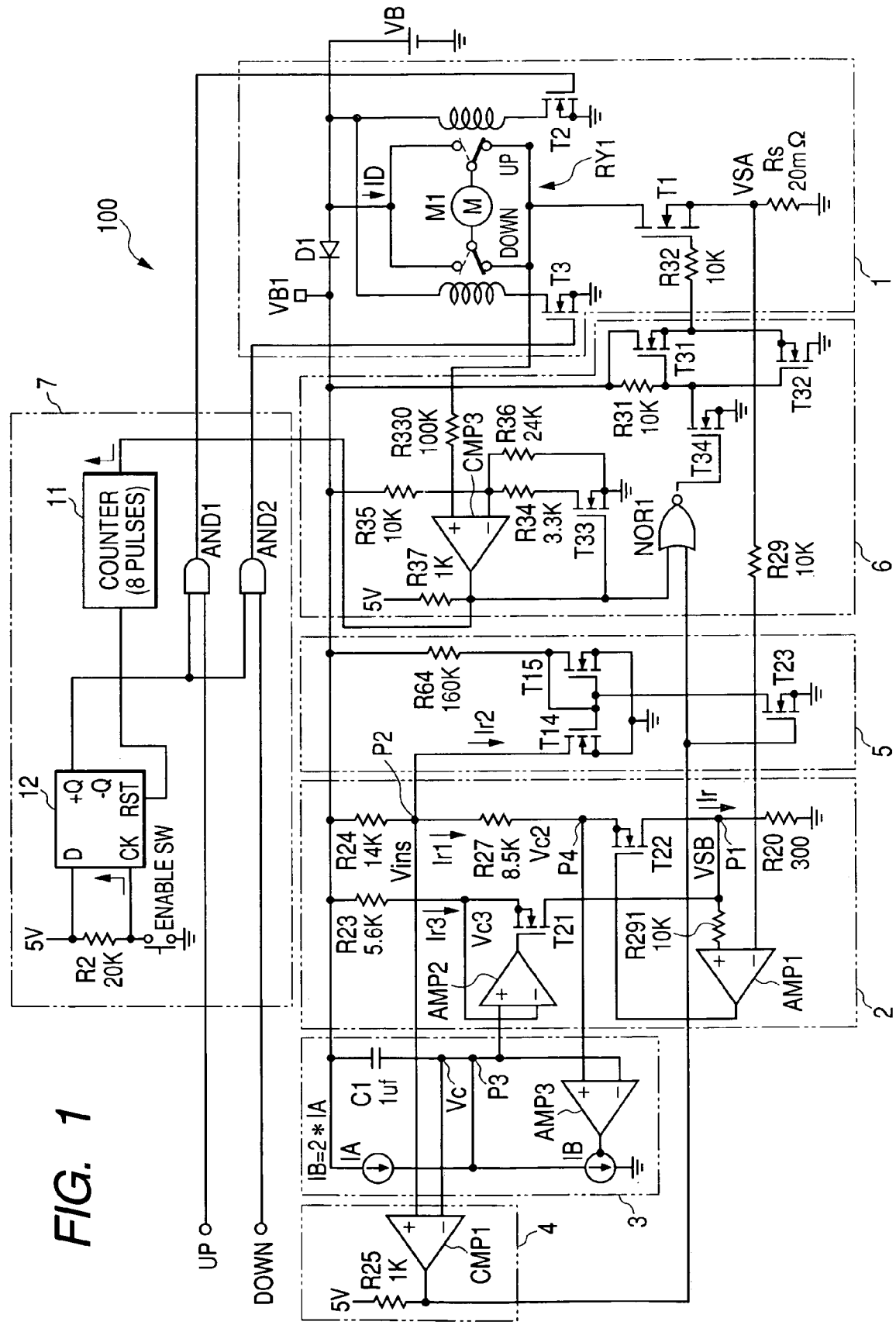
FIG. 1 is a circuit diagram showing the configuration of a power window driving apparatus according to an embodiment of the invention.

An embodiment of the invention will be described based on the drawings. FIG. 1 is a circuit diagram showing the configuration of a power window driving apparatus according to an embodiment of the invention. As shown in the diagram, a power window driving apparatus 100 reversibly drives so as to rotate a power window driving motor M1. The power window driving apparatus 100 is installed in a vehicle and includes a motor driving circuit 1, a reference current generating circuit (a reference current generator) 2, a reference voltage generating circuit (a reference voltage generator) 3, a comparison circuit (a comparator) 4, a current limit width setting circuit 5 used when a current limiting operation is performed, a current limiting circuit 6 and a logic circuit 7.

The motor driving circuit 1 includes a relay RY1 for reversibly switching the polarity of an output voltage of a battery power supply VB so as to control the driving and stopping of the driving motor M1, FETs (T2, T3: hereinafter, semi-conductors will be described as FETs) which are semi-conductors for switching on and off the relay RY1, an FET (T1) interposed between the driving motor M1 and a ground, a shunt resistance Rs and a diode D1 provided at a position along the length of a path connected to a control circuit side which is posterior to the battery power supply VB for protecting the circuit when an opposite connection is made to the battery power supply. In addition, the motor driving circuit also includes a resistance R32 which is connected to a gate of the semiconductor (T1).

One end of the driving motor M1 is connected to a positive terminal of the battery power supply VB via a contact of the relay RY1, and the other end thereof is connected to one end of the current limiting FET (T1) via a contact of the relay RY1, the other end of the FET (T1) being connected to one end of the shunt resistance Rs. In addition, the other end of the shunt resistance is connected to the ground.

Then, the relay contacts are switched based on a driving signal output from the logic circuit 7 so as to rotate the driving motor M1 normally or reversely.

A current flowing to the driving motor M1 flows through the FET (T1) and the shunt resistance Rs and generates in the shunt resistance Rs a voltage drop (this is referred to as VSA) which is proportional to a motor current.

While the FET (T1) is held to be continuously on in a normal operation, when the jamming of an obstacle by the window glass which is being driven occurs and the operation is then shifted to a current limiting operation, which will be described later on, the FET (T1) alternately repeats the continuously on-holding operation and an on/off operation so as to limit the motor current within a constant range.

With the FET (T1) being continuously on during the current limiting operation, the current is increased, whereas with the FET (T1) performing the on/off operation, the voltage of a first terminal (drain) of the FET (T1) fluctuates within an intermediate region between the supply voltage VB and the ground level; and the motor current is decreased with a gradient which corresponds to the rotational speed of the driving motor M1. Namely, the gradient becomes moderate as the rotational speed of the driving motor decreases.

The reference current generating circuit 2 has a circuit for generating a first current Ir1 and a circuit for generating a second current Ir3. The circuit for generating the first current Ir1 has a serial connection circuit where resistances R24, R27 and an FET (T22) are connected in series. A drain of the FET (T22) is connected to a reference resistance R20. While the FET (T22) is indicated by a single PMOS symbol, in a case where the relevant unit is realized using an IC, another configuration may be adopted provided that functions are equivalent. Note that the same applies to the other semiconductors in FIG. 1.

A gate of the FET (T22) is connected to an output terminal of an amplifier AMP1, and a negative side input terminal of the amplifier AMP1 is connected to a positive side (voltage VSA) of the shunt resistance Rs via a resistance R29, a positive side input terminal thereof being connected to a positive side or the reference resistance R20, that is, a point P1 via a resistance R291. The voltage at the point P1 is made to be VSB.

In case the voltage VSB>VSA, an output signal of the amplifier AMP1 increases. Since the FET (T22) and the resistances (R24+R27) constitute a source follower, the output signal of the amplifier AMP1 increases, and when the gate voltage of the FET (T22) increases, the first current Ir1 decreases, and the voltage VSB then decreases to thereby result in VSB=VSA.

In addition, in case the voltage VSA>VSB, the output signal of the amplifier AMP1 drops, and the current Ir1 increases, which increases the voltage VSB, resulting in VSB=VSA. Namely, the magnitude of the current Ir1 is controlled such that the voltage drop VSA of the shunt resistance Rs and the voltage drop VSB of the reference resistance R20 become equal to each other at all times.

Here, while in addition to the first current Ir1, the second current Ir3 also flows to the reference resistance R20, as will be described later on. Since the changing speed of the current Ir3 is remarkably slower than that of the current Ir1, controlling such that the voltage VSB and voltage VSA are made to be equal to each other depends on the change in the current Ir1.

The circuit for generating the second current Ir3 is configured such that one end of a resistance R23 and a source for an FET (T21) of a PMOS are connected in series, an output terminal of an amplifier AMP2 is connected to a gate of the FET (T21), and the other end of the resistance R23 is connected to a control circuit power supply VB1. In addition, a drain of the FET (T21) is connected to the point P1.

A negative side input terminal of the amplifier AMP2 is connected to a source of the FET (T21), and a reference voltage Vc output from the reference voltage generating circuit 3 is supplied to a positive side input terminal of the amplifier AMP2. Assuming that the source voltage of the FET (T21) is Vc3, Vc3=Vc is established at all times. In addition, since the second current Ir3 flows through the resistance R23, the magnitude thereof is expressed by Ir3= (VB1−Vc)/R23. Namely, the second current Ir3 is proportional to a potential difference (VB1−Vc).

The reference voltage generating circuit 3 has a capacitor C1, constant-current sources 1A, 1B used when the capacitor C1 is charged and discharged, and an amplifier AMP3 for controlling the on and off of the constant-current source 1B. Then, a positive side of the capacitor C1 is connected to the control circuit power supply VB1 and a negative side thereof is connected to a charging and discharging circuit constituted by the constant-current sources 1A, 1B, a negative side terminal voltage (a voltage at a point P3) of the capacitor C1 constituting a reference voltage Vc. A current flows to the constant-current source 1A of the charging and discharging circuit at all times. In addition, a current of a magnitude two times larger than the constant-current source 1A flows to the constant-current source 1B, and the constant-current source 1B is energized only when the output signal of the amplifier AMP3 is at an L level, and the energization is cut off when the output signal of the amplifier AMP3 is at an H level.

A negative side input terminal of the amplifier AMP3 is connected to the negative terminal of the capacitor C1 or the point P3 whose voltage constitutes the reference voltage Vc, and a positive side input terminal of the amplifier AMP3 is connected to a source (voltage Vc2: point P4) for the FET (T22) of the circuit for generating the first current Ir1.

Then, in case the voltage Vc2>Vc, an output signal of the amplifier AMP3 becomes an H level, and the constant-current source IB is cut off, whereby a current IA flows into the negative side terminal of the capacitor C1, and the voltage Vc is increased. In addition, in case the voltage Vc2<Vc, the output signal of the amplifier AMP3 becomes an L level, and a current IB flows. Then, a current of (IB−IA)=IA is induced from the negative side terminal of the capacitor C1, and the voltage Vc decreases.

FIG. 2 shows characteristic diagrams illustrating a relationship between the voltage Vc2 and the voltage Vc. The voltage Vc2 varies depending on the magnitude of the current ID which flows to the driving motor M1 and furthermore includes a variation component (hereinafter, referred to as a pulsating component) which corresponds to a current variation generated by the rectifying action of the driving motor M1.

In a case where a rectifier is constituted by 10 segments, the cycle of the pulsating component is 1 to 2[msec].

Figure 2A:
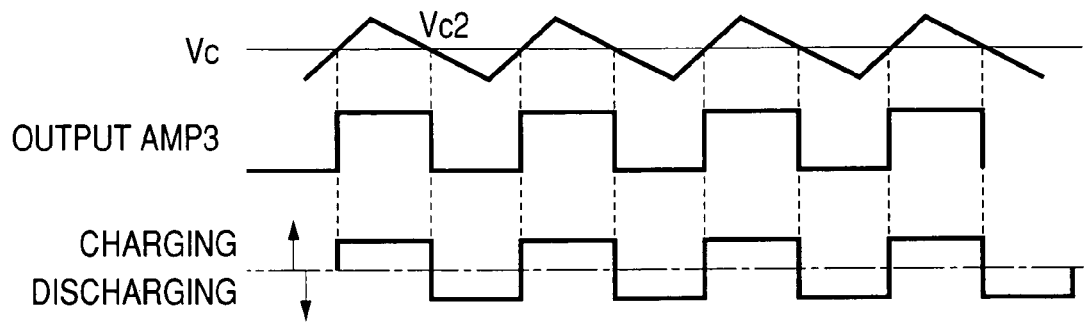
FIGS. 2A thru 2C are timing charts each showing charging and discharging of a capacitor C1 in in association with the result of a comparison between voltage Vc and voltage Vc2.

FIG. 2A shows conditions of the voltage Vc2 resulting when the current ID which flows to the driving motor M1 is stable, the output signal level of the amplifier AMP3 and the voltage Vc. While the voltage Vc2 is changed by the pulsating component, the voltage Vc changes little. In the circuit shown in FIG. 1, since the capacity of the capacitor C1 and the current IA are set to 1[μF] and 6[μA], respectively, the changing speed of the voltage Vc becomes 6[mV/msec].

Since the amplitude of the voltage Vc2 is in the order of 0.5 to several [volts], the voltage Vc changes little when compared with the voltage Vc2. The output signal of the amplifier AMP3 repeatedly fluctuates between the H level and the L level in synchronism with the pulsating cycle, whereby the capacitor C1 is charged and discharged, and the voltage Vc converges on a time mean value of the variation width of the voltage Vc2.

Figure 2B:
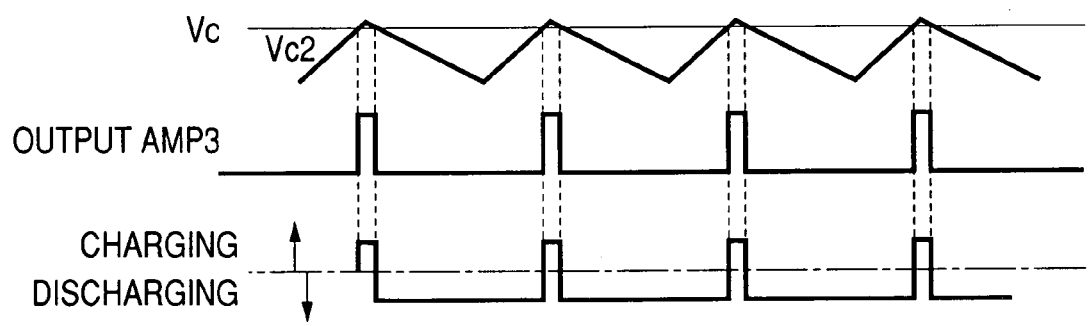

FIG. 2B shows a case where the current ID which flows to the driving motor M1 is increased. When the motor current ID is increased, the reference current Ir is also increased. Since the second current Ir3 is controlled by the voltage Vc and cannot adjust itself to a change, all of an increase in current Ir is reflected to the first current Ir1.

The voltage Vc2 decreases as the current Ir increases, and the voltage Vc2 decreases relative to the voltage Vc. As a result, a charging period becomes shorter, whereas a discharging period becomes longer. Here, charging denotes a state in which a current from the constant-current source 1A flows into the negative terminal of the capacitor C1, whereas discharging denotes a state in which the same current flows out of the same terminal. Due to this, the reference voltage Vc decreases as the voltage Vc2 decreases.

The following speed of 6[mV/msec] of the voltage Vc can follow a current variation of the driving motor resulting when no jamming of an obstacle by the window glass occurs, but the following speed of the voltage Vc is a speed at which the voltage Vc cannot follow a drastic current increase which results when the jamming of an obstacle by the window glass occurs.

Figure 2C:
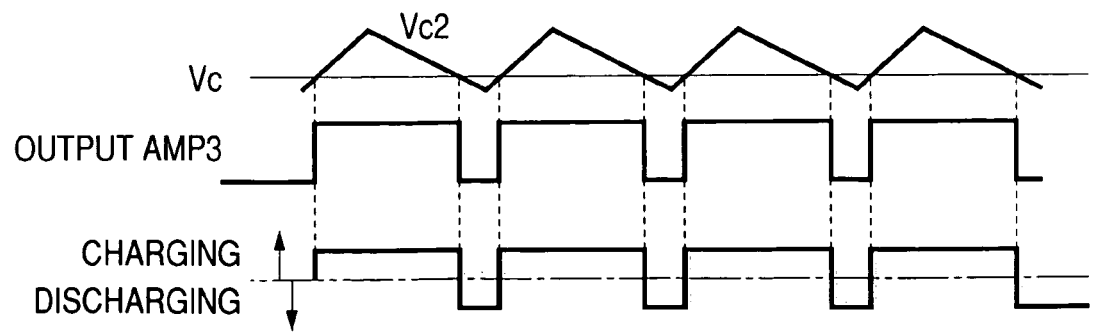
Figure 3:
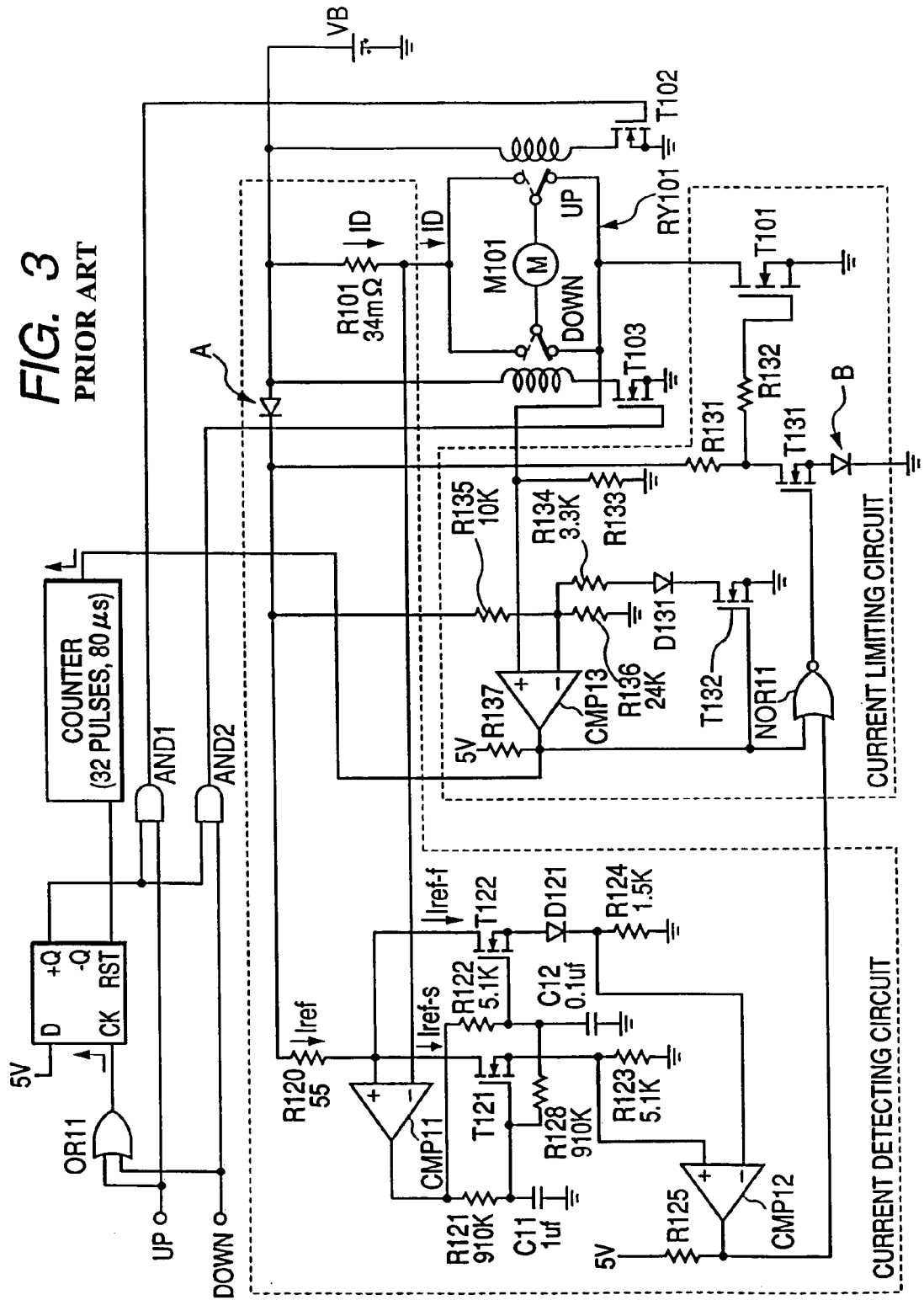
FIG. 3 is a circuit diagram showing the configuration of a related power window driving apparatus.

FIG. 2C shows a state in which the motor current ID decreases. The voltage Vc2 increases relative to the voltage Vc when the motor current decreases, and a period becomes longer during which the output signal of the amplifier AMP3 stays at the H level, and the capacitor C1 is charged, whereby the voltage Vc increases.

A point to which attention should be paid here is that all of a change in the motor current ID is temporarily reflected to the first current Ir1, and as a result, the relative position of the voltage Vc2 to the voltage Vc changes, resulting in the fact that the voltage Vc moves (follows). Namely, the change in the motor current ID is reflected as the change in the relative position between the voltage Vc and the voltage Vc2 in an ensured fashion. However, the holding time of the change depends on the following speed of the voltage Vc. It is seen that the voltage Vc performs a convenient motion in fulfilling a function of reference relative to the change in the motor current ID. Namely, since the voltage Vc can be used as a reference value for the change in the voltage Vc2, the amount of change in the current Ir can be obtained.

The comparison circuit 4 shown in FIG. 1 is constituted by a comparator CMP1 and a resistance R25. A positive side input terminal of the comparator CMP1 is connected to a connecting point (a point P2: voltage Vins) between the resistances R24 and R27, whereas a negative side input terminal of the comparator CMP1 is connected to the point P3 (voltage Vc).

When an obstacle is seized by the window glass, the motor current ID increases drastically. As a result, the first current Ir1 increases A detection of the seizure is attained by comparing a comparison signal Vins (the voltage at the point P2) and the reference voltage Vc at the comparator CMP1.

In a normal motor driving condition where no obstacle seizure occurs, Vins>Vc, and-an output signal of the comparator CMP1 has been at an H level.

As will be described later on, when an obstacle seizure occurs, the motor current ID increasing drastically, the voltage Vins decreases to result in Vins<Vc, and the output signal of the comparator CMP1 comes to stay at an L level, whereby the FET (T1) starts the on/off operation. The amount of decrease in the voltage Vins resulting when the on/off operation is started constitutes a threshold value for detecting the obstacle seizure, and the threshold voltage is then denoted by Vjth.

The voltage Vjth is constituted by a difference between the voltage Vins resulting before the obstacle seizure occurs and the voltage Vc, that is, the voltage Vjth can be expressed as Vjth=Vins−Vc.

The current limit width setting circuit 5 includes two FETs (T14), (T15) which are connected to each other at gates thereof and an FET (T23) whose drain and source are connected to the gates of the two FETs (T14), (T15) and the ground, respectively.

In addition, a drain of the FET (T15) is connected to the control circuit power source VB1 via a resistance R64, and a drain of the FET (T14) is connected to the positive side input terminal (that is, the point P2) of the comparator CMP1.

The current limiting circuit 6 includes a comparator CMP3, FETs (T31) to (T34), a NOR circuit NOR1 and resistances R31, R34 to R37 and R330.

A positive side input terminal of the comparator CMP3 is connected to a drain of the FET (T1) via the resistance R330, and a negative side input terminal thereof is connected to the ground via the resistance R36. In addition, the negative side input terminal of the comparator CMP3 is connected to the control-circuit power supply VB1 via the resistance R35 and is further connected to a drain of the FET (T33) via the resistance R34.

A gate of the FET (T33) is connected to an output terminal of the comparator CMP3, a counter circuit 11 and one of input terminals of the NOR circuit NOR1 and is also connected to a 5-volt power supply via the resistance R37. In addition, an output terminal of the NOR circuit NOR1 is connected to a gate of the FET (T34). A source of the FET (T34) is connected to the ground, and a drain thereof is connected a gate of the FET (T32) and a gate of the FET (T31). Additionally, the drain of the FET (T34) is connected to the control circuit power supply VB1 via the resistance R31 and is also connected to a drain of the FET (T31).

A drain of the FET (T32) is connected to the ground, and a source thereof is connected to the gate of the FET (T1) via the resistance R32 and is also connected to a source of the FET (T31).

The logic circuit 7 includes a flip-flop circuit 12, the counter circuit 11, a resistance R2 and the AND circuits AND1, AND2.

Next, the operation of the power window driving apparatus 100 according to the embodiment will be described. When a power window raising (UP) or a lowering (DOWN) switch is switched on, the signal is input into either the AND circuit AND1 or the AND circuit AND2, and for example, when the raising (UP) switch is switched on, the FET (T2) is on, whereby the relay RY1 is activated, and the voltage of the battery power source VB is applied to the driving motor M1, which is then driven to rotate in a direction in which the window glass is raised. Namely, the current flows sequentially through the battery power supply VB, the driving motor M1, the FET (T1) and the shunt resistance Rs in that order, whereby the motor M1 is driven.

As this occurs, the voltage VSA whose magnitude is proportional to the motor current is generated at the ends of the shunt resistance Rs. In addition, since the voltage VSB of the point P1 is controlled by the action of the amplifier AMP1 of the reference current generating circuit 2 in such a manner as to become equal to the voltage VSA, the current Ir which flows through the resistance R20 takes a current value of a magnitude which is proportional to the motor current ID.

Then, since the time mean value of the voltage Vc2 at the point P4 and the reference voltage Vc (the voltage at the point P3) are equal and the voltage Vins at the point P2 becomes the voltage which is higher by the amount of voltage drop by the resistance R27 than the voltage Vc2, in the normal operation where no obstacle seizure occurs, the input signal of the comparator CMP1 becomes larger on the positive side, and consequently, this output signal stays at the H level.

This allows the H-level signal to be input into one of the input terminals of the NOR circuit NOR1, and the output signal of the NOR circuit NOR1 comes to stay at the L level irrespective of the level of an input signal (the output signal of the CMP3) that is input into the other terminal thereof, whereby the FET (T34) becomes off and the FET (T32) becomes off. Since this cause the gate of the FET (T31) to come to stay at the level of the control circuit power supply VB1, the source of the FET (T31) becomes a voltage which is lower by the quantity of the threshold voltage than the control circuit power supply VB. This voltage causes the FET (T1) to be switched on. Namely, the current flows to the driving motor M1.

Here, when the seizure of an obstacle by the window glass occurs, causing an excess current to flow to the driving motor M1, the motor current ID increases, and in association with the increase, the current Ir1 increases. Then, since the voltage drop at the resistance R24 increases, the voltage Vins at the point P2 decreases, and when the voltage Vins becomes lower than the reference voltage Vc, the output signal of the comparator CMP1 is shifted from the H level to the L level. As this occurs, the output signal of the CMP3 is at the "L" level.

As a result, since the output signal of the NOR circuit NOR1 becomes the H level, the FET (T34) is on, and the gates of the FETs (T31), (T32) both become the ground level, the source of the FET (T32) becomes a voltage which is higher by the quantity of the threshold voltage than the ground level, and the FET (T1) is off. Namely, the current flowing to the driving motor M1 is cut off. Note that since the FET (T23) is off as that occurs, the current Ir2 flows, and the voltage Vins lowers further. The operation will be described later on.

Since the voltage on the drain side of the FET (T1) increases as the FET (T1) is off, the voltage on the positive side input terminal of the comparator CMP3 increases, and the output signal of the comparator CMP3 is shifted from the L level to the H level. Then, since the output of the NOR circuit NOR1 becomes the L level and the FET (T1) is on, the motor current ID flows again. In the event that the excess current has not yet decreased in this state, the on/off operation of the FET (T1) is repeated in a similar operating procedure to that described above, that is, an inverting input terminal voltage of the comparator CMP3 is controlled with L level voltage and H level voltage by the FET (T33). Then, the number of times of repetition is counted by the counter circuit 11, and in the event that the number of times of repetition reaches a predetermined number of times (in this example, 8 times), the output signals of the AND circuits AND1, AND2 are forced to become the L level by outputting an L level signal to one of the input terminals of each of the AND circuits AND1, AND2, whereby the relay circuit RY1 is stopped. Namely, the driving motor M1 is stopped.

On the other hand, in the event that the excess current has disappeared before the number of times of repetition reaches 8 times, whereby the constant current is restored, the driving motor M1 continues to be driven as it is.

Then, in the power window driving apparatus 100 that is configured as has been described heretofore, since the diode D1 is provided between the power supply VB and the control circuit 100, in the event that the mechanic erroneously connects the driving apparatus to the wrong opposite terminals of the battery power supply, that is, the mechanic connects the driving apparatus to the positive side and negative side terminals of the battery power supply in an opposite fashion, the whole circuit can be protected by the diode D1 so provided.

In addition, since the shunt resistance Rs is provided between the FET (T1) and the ground, the current Ir which is proportional to the motor current ID can be generated with high accuracy. Consequently, the increase in the motor current can be detected in an ensured fashion, thereby making it possible to detect the obstacle seizure by the window glass with high accuracy.

Next, how to set the threshold voltage Vjth (=Vins−Vc) in the comparison circuit 4 will be described.

When the reference voltage Vc follows the motor current ID, Vc2(Av)=Vc. "Vc2(Av)" denotes a mean value of the voltage Vc2. In addition, when "(Av)" is combined with another variable, it similarly denotes a mean value of the variable so combined.

Since Vc=Vc3 (a negative side terminal voltage of R23) now, Vc2(Av)=Vc3 (the negative side terminal voltage of R23). Consequently, the following equation (1) is established.

$$R23*Ir3 = VB1 - Vc2(Av)$$
$$= (R24+R27)*Ir1(Av)$$
$$Ir1(Av) = R23/(R24+R27)*Ir3$$
$$= R23/(R24+R27)*(Ir(Av)-Ir1(Av)),$$

consequently, $$Ir1(Av) = R23/(R23+R24+R27)*Ir(Av) \quad (1)$$
$$= b*Ir(Av)$$

where, b=R23/(R23+R24+R27).

Since b mentioned above is constant, from the equation (1), the mean value Ir1(Av) of the current Ir1 is proportional to the mean value Ir(Av) of the reference current Ir.

In FIG. 1, since R23=5.6[KΩ], R24=14[KΩ] and R27=8.5[KΩ], b=0.2, and the current Ir(Av)=0.2*Ir(Av). In addition, since Ir(Av) is proportional to the mean value of the motor current ID, Ir1(Av) is proportional to the mean value of the current ID.

Assuming that no pulsating component exists in the motor current ID, the threshold Vjth can be expressed by the following equation (2).

$$Vjth=Vins-Vc=R27*Ir1(Av) \quad (2)$$

Consequently, the threshold voltage Vjth is proportional to the motor current ID, and it is understood that the threshold voltage Vjth increases as the motor current ID increases and hence the threshold voltage Vjth is not a constant value. In reality, since the pulsating component is contained in the motor current ID, a threshold Vjth is obtained as follows which would result when the containment of the pulsating component in the motor current ID is taken into consideration.

In the event that the voltage Vins lowers below the voltage Vc with Vc remaining unchanged when the obstacle seizure by the window glass occurs, a current limiting operation is started. The pulsating component is included in the voltage Vins, and the voltage Vins which corresponds to a trough value of the pulsating component lowers below the voltage Vc first. Namely, it is seen that the pulsating component comes to be related to the threshold Vjth.

The pulsating component of the motor current is generated when the winding construction is changed due to a change in the relative position between the rectifier segments and the brush, which then changes an armature resistance value.

When considering a case with a double-pole DC motor with a 10-segment rectifier, since a winding loop corresponds to each segment, a winding construction resulting when the brush contacts only one segment is such that two lines each having serially aligned five winding loops are arranged in parallel, and a winding construction resulting when the brush contacts two segments is such that two lines each having serially aligned four winding loops are arranged in parallel. Assuming that winding resistance values (=armature resistance values) of the respective cases are Ra5, Ra4 and that motor current values resulting with the respective winding resistance values are ID5, ID4, the following equation is established.

$$Ra5=5/4*Ra4$$

$$ID5(Min)=4/5*ID4(Max)$$

where, ID5 (Min) denotes the minimum value of ID5, and ID4 (Max) denotes the maximum value of ID4.

The mean value ID(Av) of the motor current ID(Av)={ID5(Min)+ID4(Max)}/2=9/8*ID5(Min), and the amplitude of the pulsating component=ID4(Max)−ID5(Min)=1/4*ID5 (Min). Namely, the amplitude of the pulsating component (Peak to Peak) is proportional to the motor Current mean value ID(Av). It is seen that the fact that Vjth obtained in the equation (2) on the assumption that there exists no pulsating component is proportional to the motor current mean value ID(Av) is a requisition for properly setting the vjth. Assuming that a proportional constant for the amplitude of the pulsating component relative to the motor current mean value ID(Av) is a, $$a=\{1/4*ID5(Min)\}/\{9/8*ID5(Min)\}=2/9=0.22$$

where this proportional constant a is one resulting when assuming that there is no influence of the inductance of the winding, and as the motor rotational speed becomes faster, the pulsating cycle becomes shorter and the influence of the winding inductance becomes stronger, a becomes smaller. 0.22 is the maximum value of a, and a=0.1 to 0.15 in normal motors.

To express Vjth using the proportional constants a and b, the following equations (3), (4) result.

$$Vjth = Vins - Vc \quad (3)$$
$$= (VB1 - Vc) - (VB1 - Vins)$$
$$= (VB1 - Vc2(Av)) - (VB1 - Vins)$$
$$= (R24 + R27) * Ir1(Av) - R24 * Ir1$$
$$= (R24 + R27) * Ir1(Av) - R24 * (Ir1(Av) + a/2 * Ir(Av))$$
$$= R27 * Ir1(Av) - R24 * a/2 * Ir(Av)$$
$$= (R27 * b - R24 * a/2) * Ir(Av)$$

When substituting b in the equation above with b=R23/(R23+R24+R27), $$Vjth = \{R27*R23/(R23+R24+R27) - R24*a/2\} * IrAv \quad (4)$$

The threshold voltage Vjth is proportional to the reference current mean value Ir(Av), and consequently, the threshold voltage Vjth is proportional to the mean value ID(Av) of the motor current ID. It is seen that the proportional constant thereof depends on R23, R24, R27 and a. In the power window driving apparatus 100 according to the embodiment, while it is inevitable that the threshold voltage Vjth depends on the motor pulsating current amplitude, the setting of the threshold voltage Vjth which is proportional to the motor current mean value becomes possible by making use of the fact that the magnitude of the pulsating amplitude is proportional to the motor current mean value.

Vjth influences a time from the occurrence of an obstacle seizure by the window glass to the start of reverse rotation of the motor, and the time becomes longer as the Vjth becomes larger, and as a result, the reversal load (the obstacle seizing load resulting when the driving motor M1 is stopped or reversed) increases.

Vjth needs to be made smaller in order to reduce the reversal load. In this respect, while it is not considered preferable that Vjth becomes larger as the motor current mean value increases, since that the motor current mean value increases means that the motor rotational speed decreases, even in the event that the time from the occurrence of the obstacle seizure to the stop or start of reverse rotation of the motor becomes longer when the motor rotational speed decreases, the reversal load does not increase. Consequently, it is seen that making Vjth proportional to the motor current mean value as expressed in the equation (4) is a good method used when attempting to avoid the influence from the pulsating component and to secure an appropriate reversal load.

The proportional constant in the equation (4) can be set arbitrarily by combining the resistances R23, R24, R27. In the circuit shown in FIG. 1, since R23=5.6 KΩ, R24=14 KΩ, R27=8.5 KΩ, R20=300 Ω, Rs=20 mΩ, Vjth=(1.7−7a)*Ir(Av)*$10^3$=(0.113−0.467*a)*ID(Av), and assuming that ID(Av)=5 A, a=0.1, Vjth=0.33V.

Thus, a desired threshold voltage Vjth and hence a desired reversal load can be set.

Next, the operation of the current limit width setting circuit 5 when performing a current limiting operation will be described. When the comparator (CMP1) detects an obstacle seizure by the window glass, a current limiting operation is started. The current limiting operation is controlled by the current controller 6, and the configuration and operation thereof can be the same as those resulting when the shunt resistance Rs is disposed on the positive side of the battery power supply VB. This is because even when the shunt resistance Rs is disposed on the positive side of the battery power supply VB, the semi-conductor for controlling the motor current is connected to the negative terminal side of the battery power source VB, and while the shunt resistance Rs is also interposed between the semiconductor for controlling the current and the battery power source VB in the configuration of the embodiment, the voltage drop by the shunt resistance Rs is 0.1 to 0.6V, which is small. Therefore, the same configuration and the same operation as those resulting when the shunt resistance Rs is disposed on the positive side of the battery power supply VB can be used for the current controller 6 and the semi-conductor T1.

Next, the operation of the current limit width setting circuit 5 will be described. The current limit width setting circuit 5 includes the FETs (T14), (T15), (T23) and the resistance R64, and in FIG. 1, any of the semiconductors is indicated by NMOS. The FETs (T14), (T15) are NMOS of the same properties, and a drain of T14 is connected to the point P2 of the comparison signal Vins. A gate of T14 is connected to a gate and a drain of T15, and sources of T14, T15 are grounded. A gate of T23 is connected to the output of CMP1, and a source thereof is grounded.

T14 and T15 constitute a current mirror circuit, and when the output of CMP1 becomes the L level, T23 is off, and a drain current Ir2 of T14 is induced from the point P2. The current Ir2 becomes a third current, and the magnitude thereof depends on the resistance 64 and the voltage of the battery power supply VB and becomes larger with an increase in the voltage VB.

When the output signal of CMP1 before the obstacle seizure occurs is at the H level, the current Ir2 does not flow. When the obstacle seizure occurs and the output signal of CMP1 becomes the L level, the on/off operation is started, and Ir2 starts to flow at the same time. Since the current Ir2 flows through the resistance R24 while being superposed on Ir1, the voltage Vins is reduced by R24*Ir2. Due to this, Vc>Vins+R24*Ir2, and the output signal of CMP1 becomes stable to stay at the L level.

When the motor current is decreased by the on/off operation of the FET (T1), the current Ir1 is decreased, and the amount of decrease exceeds Ir2, again Vc<Vins, whereby the output signal of CMP1 becomes the H level, and T23 is on, the current Ir2 being cut off. This results in Vc<Vins−R24*Ir2, and the output signal of CMP1 becomes stable to stay at the H level, and NMOS-FET(T1) is continuously on, the motor current starting to increase, whereby the voltage Vins starts to be lowered.

Since Vc has changed little after the current limiting operation was started, the motor current increases and decreases repeatedly within a range in which its upper limit is constituted by a value which corresponds to Vc and its lower limit is constituted by a value which is lower by an amount of current which corresponds to the current Ir2 than the upper limit. Namely, the magnitude of the current Ir2 determines the current limit width. Furthermore, the current Ir2 provides a hysteresis effect to an input to CMP1.

As has been described above, the current Ir2 does not flow until the obstacle seizure occurs. Namely, Ir2 has nothing to do with the control in which Vc follows a change in the motor current. This is effective in reducing scattering elements in the following control so as to make the control simple and is also effective in setting the current limit width independently from the following control.

Since the erroneous stopping of the power window can be prevented, the invention is extremely useful when applied to automotive power windows.

What is claimed is:

1. A power window driving apparatus, comprising:
   a motor, which drives a window by supplying a supply voltage of a power supply;
   a control circuit, which controls the motor so as to stop or reverse a rotation of the motor when a motor current flowing to the motor is increased;
   a shunt resistance, which is provided between the motor and a ground, and detects the motor current as a voltage value; and
   a diode, which is provided between a positive side of the power supply and the control circuit for protecting the control circuit when the power supply is inversely connected,
   wherein the diode is connected such that the motor current does not flow through the diode.

2. The power window driving apparatus as set forth in claim 1, wherein the diode is arranged between the motor and the control circuit.

3. A power window driving apparatus, comprising
   a motor, which drives a window by supplying a supply voltage of a power supply;
   a shunt resistance, which detects a motor current flowing to the motor, and is provided between the motor and a ground;
   a control circuit, which controls the motor, and the control circuit comprising:
      a reference current generator, which includes:
         a first circuit, which has a reference resistance and generates a reference current which has a level corresponding to the motor current by detecting a voltage generated in the shunt resistance, and the first circuit causing a first current to flow to the reference resistance so that a voltage generated in the reference resistance becomes substantially equal to a voltage generated in the shunt resistance, and the first current having a level corresponding to a variation value of the motor current; and
         a second circuit, which generates a second current which constitutes a difference between the reference current and the first current;
      a comparator, which compares a reference voltage generated from a time mean value of a first voltage with a comparison signal being greater than the first voltage, and determines whether or not an excess current flows to the motor based on a result of a comparison thereof, the first voltage and the comparison signal being converted from the first current; and
      a controller, which stops or reverses a rotation of the motor when the comparator determines that the excess current flows to the motor,
   wherein the shunt resistance is provided between the motor and a ground; and
   wherein a diode is provided between a positive side of the power supply and the control circuit for protecting the control circuit when the power supply is inversely connected.

4. The power window driving apparatus as set forth in claim 3, wherein the reference resistance is connected to the first circuit and the second circuit which are connected in parallel;
   wherein the reference current which is formed by merger of the first current with the second current flows to the reference resistance; and
   wherein the reference current generator controls a magnitude of the first current so as to equalize a voltage generated in the shunt resistance with a voltage generated in the reference resistance.

5. The power window driving apparatus as set forth in claim 3, wherein the first circuit includes a first comparator for detecting a difference between a voltage generated in the shunt resistance and a voltage generated in the reference resistance, a first semi-conductor element which is controlled based on an output signal of the first comparator, and a first resistance connected between an end of the first semi-conductor element and the power supply, the other end of the first semi-conductor element being connected to the reference resistance; and
   wherein a voltage drop by the first resistance is proportional to the first current when the first semi-conductor element is operated.

6. The power window driving apparatus as set forth in claim 5, wherein the reference voltage is generated as the time mean value of the first voltage, when a voltage at a connecting point between the first resistance and the first semi-conductor element is the first voltage;
   wherein the second current is proportional to a difference between the supply voltage and the reference voltage; and
   wherein the second current is equal to the reference current by adding the first current.

7. The power window driving apparatus as set forth in claim 6, further comprising a reference voltage generator, which has a capacitor connected
   between the supply voltage and the reference voltage, the reference voltage generator generating the reference voltage from the first voltage;
   wherein the capacitor is discharged by a constant-current so as to increase the reference voltage, when the first voltage is greater than the reference voltage;
   wherein the capacitor is charged by a constant-current so as to fall the reference voltage into the time mean value of the first voltage, when the first voltage is smaller than the reference voltage.

8. The power window driving apparatus as set forth in claim 6, wherein the second current generating circuit includes;
   a serial connection circuit, having a second semi-conductor element and a second resistance which are connected in series, the second resistance being connected to the power supply, and the second semi-conductor element being connected to the reference resistance; and
   a second comparator, which compares a voltage at a connecting point between the second semi-conductor element and the second resistance with the reference voltage,
   wherein the second semi-conductor element is controlled based on an output signal of the second comparator so that the voltage at the connecting point coincides with the reference voltage.

9. The power window driving apparatus as set forth in claim 5, wherein the first resistance is constituted by a third resistance and a fourth resistance, a voltage at a connecting point between the third resistance and the fourth
resistance being a comparison signal;
wherein the comparator includes a third comparator which compares the comparison signal with the reference voltage;
wherein when the third comparator determines that the comparison signal is larger than the reference voltage, a third semi-conductor element for supplying the motor current is turned on; and
wherein when the third comparator determines that the comparison signal is smaller than the reference voltage, the third semi-conductor element is turned On and Off, so that the motor current is limited so as to fall within a constant range.

10. The power window driving apparatus as set forth in claim 9, further comprising a current limit width setting circuit, which derives a third current from the connecting point between the third resistance and the fourth resistance,
wherein a current range within which the motor current is limited is proportional to the third current.

11. The power window driving apparatus as set forth in claim 10, wherein the magnitude of the third current is set so as to depend on the magnitude of the supply voltage, so that the third current increases as the supply voltage increases.

12. The power window driving apparatus as set forth in claim 9, wherein a threshold voltage for determining that an excess current is flown to the motor is
proportional to the motor current; and
wherein the magnitude of the threshold voltage is set based on a resistance ratio of the second resistance, the third resistance and the fourth resistance.

13. The power window driving apparatus as set forth in claim 10, wherein when the motor current pulsates due to a rectifying action of the motor so that the first current pulsates, the magnitude of the third current is set so as not to exceed a pulsating amplitude of the first current.

* * * * *